(12) United States Patent
Mahyar et al.

(10) Patent No.: US 11,222,272 B2
(45) Date of Patent: *Jan. 11, 2022

(54) METHODS AND SYSTEMS FOR ADVANCED CONTENT CACHEABILITY DETERMINATION

(71) Applicant: Verizon Digital Media Services Inc., Dulles, VA (US)

(72) Inventors: Hooman Mahyar, Los Angeles, CA (US); Amir Reza Khakpour, Los Angeles, CA (US); Derek Shiell, Los Angeles, CA (US); Robert J. Peters, Santa Monica, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/679,523

(22) Filed: Nov. 11, 2019

(65) Prior Publication Data

US 2020/0219011 A1 Jul. 9, 2020

Related U.S. Application Data

(63) Continuation of application No. 15/065,586, filed on Mar. 9, 2016, now Pat. No. 10,474,965.

(51) Int. Cl.
*G06N 5/04* (2006.01)
*H04L 29/08* (2006.01)
(Continued)

(52) U.S. Cl.
CPC ........... *G06N 5/04* (2013.01); *G06F 16/9535* (2019.01); *G06F 16/9574* (2019.01);
(Continued)

(58) Field of Classification Search
CPC . G06N 20/00; H04L 67/1017; H04L 67/2842; G06F 16/9574
See application file for complete search history.

(56) References Cited

U.S. PATENT DOCUMENTS 6,351,767 B1   2/2002 Batchelder et al.
7,395,348 B1 * 7/2008 Cieslak ............... H04L 67/2842
                                                    709/232
(Continued)

*Primary Examiner* — Nam T Tran
(74) *Attorney, Agent, or Firm* — Ansari Katiraei LLP; Arman Katiraei; Sadiq Ansari

(57) ABSTRACT

The embodiments provide systems and methods for efficiently and accurately differentiating requests directed to uncacheable content from requests directed to cacheable content based on identifiers from the requests. The differentiation occurs without analysis or retrieval of the content being requested. Some embodiments hash identifiers of prior requests that resulted in uncacheable content being served in order to set indices within a bloom filter. The bloom filter then tracks prior uncacheable requests without storing each of the identifiers so that subsequent requests for uncacheable requests can be easily identified based on a hash of the request identifier and set indices of the bloom filter. Some embodiments produce a predictive model identifying uncacheable content requests by tracking various characteristics found in identifiers of prior requests that resulted in uncacheable content being served. Subsequent requests with identifiers having similar characteristics to those of the predictive model can then be differentiated.

19 Claims, 11 Drawing Sheets

(51) Int. Cl.
  *G06N 20/00* (2019.01)
  *G06F 16/9535* (2019.01)
  *G06F 16/957* (2019.01)

(52) U.S. Cl.
  CPC ......... *G06N 20/00* (2019.01); *H04L 67/1017* (2013.01); *H04L 67/1027* (2013.01); *H04L 67/2842* (2013.01); *H04L 67/2847* (2013.01)

(56) References Cited

U.S. PATENT DOCUMENTS

| | | | |
|---|---|---|---|
| 7,975,025 B1 | 7/2011 | Szabo et al. | |
| 9,298,616 B2 | 3/2016 | Soundararajan et al. | |
| 10,133,673 B2 | 11/2018 | Bedi et al. | |
| 10,225,365 B1 * | 3/2019 | Hotchkies | H04L 67/2842 |
| 2003/0005036 A1 | 1/2003 | Mitzenmacher | |
| 2003/0051100 A1 | 3/2003 | Patel | |
| 2005/0060493 A1 * | 3/2005 | Krissell | G06F 16/9574 |
| | | | 711/118 |
| 2005/0144317 A1 * | 6/2005 | Chase | H04L 67/2814 |
| | | | 709/238 |
| 2012/0203866 A1 | 8/2012 | Yoo et al. | |
| 2012/0331228 A1 * | 12/2012 | Shatz | G06F 16/9574 |
| | | | 711/118 |
| 2015/0263977 A1 * | 9/2015 | Nair | H04L 67/2852 |
| | | | 709/226 |
| 2017/0257452 A1 * | 9/2017 | Hoiles | H04L 67/2842 |

* cited by examiner

METHODS AND SYSTEMS FOR ADVANCED CONTENT CACHEABILITY DETERMINATION

CLAIM OF BENEFIT TO RELATED APPLICATIONS

This application is a continuation of U.S. non-provisional application Ser. No. 15/065,586, entitled "METHODS AND SYSTEMS FOR ADVANCED CONTENT CACHEABILITY DETERMINATION", filed Mar. 9, 2016, now U.S. Pat. No. 10/474,965. The contents of application Ser. No. 15/065,586 are hereby incorporated by reference.

BACKGROUND ART

Distributed platforms, such as content delivery networks (CDNs), operate a distributed set of servers for delivering content and services to requesting users spread across the Internet. A primary objective of the distributed platform is to optimize and improve the content and service delivery performance of its servers so that the content and services are served to requesting users in less time.

Caching is one method by which the distributed platform improves content delivery performance. The distributed platform deploys different sets of caching servers to different geographic regions. Each set of caching servers deployed to a particular region is referred to as a point-of-presence (PoP). The location of each PoP is specifically selected to be geographically proximate to a large population of content requesting and consuming users. The caching servers cache content provider content by retrieving the content provider content from content provider origin servers and temporarily storing (i.e., caching) copies of the content in memory. The distributed platform routes user requests to the caching servers that are closest to the requesting users. The caching servers are then able to respond to the requests by serving the cached copies of the content from memory without having to retrieve the content again from the more distant origin servers.

To maximize the cache footprint and cache utilization of each PoP, the distributed platform places directors in each of the PoPs. The one or more directors of a particular PoP control the distribution of user requests across the caching servers of that particular PoP. In some cases, the directors maximize the cache footprint and cache utilization of the PoP caching servers by performing a persistent request distribution. In particular, a director operating in PoP with a particular set of caching servers routes requests for the same content to the same caching server of the particular set of caching servers. In doing so, each caching server of the set of caching servers is tasked with caching and delivering a unique subset of the overall content cached within the PoP. This reduces the number of distributed platform caching servers that retrieve content from a content provider's origin server, maximizes cache-hit ratios, and reduces redundant caching of the same content in different caching servers of the same PoP, thereby allowing the PoP to cache a greater total number of unique content than if multiple caching servers of the same PoP were to cache different copies of the same content. Directors typically perform the persistent request distribution by hashing a request Uniform Resource Locator (URL) and using the hash result to select from one of the caching servers of the PoP.

In real-world scenarios, persistent request distribution can suffer inefficiencies that degrade or otherwise lessen caching server performance and overall content delivery performance of the distributed platform. Inefficiencies arise when the content provider content delivered by the distributed platform caching server involves a mix of cacheable and uncacheable content.

Cacheable content is any static content that remains unchanged for some period of time and is not customized on an individual user basis. Consequently, the same copy of cacheable content can be served to different users. Cacheable content includes images and media streams as some examples.

Uncacheable content is dynamic content or content that is in some way customized on a per request or per user basis. Uncacheable content includes secure websites that are delivered after a user login or ecommerce sites that are customized based on prior search or purchase activity of the user. As the name implies, uncacheable content is content that, for the most part, cannot be cached by the distributed platform caching servers. Each uncacheable content request received by a caching server triggers a retrieval back to the content provider's origin server in order to obtain the content.

Uncacheable content mixed with cacheable content and persistent request distribution creates inefficiencies in distributed platform performance because caching servers that receive the uncacheable content requests spend more time and resources in responding to the uncacheable content requests than caching servers that receive and respond to cacheable content requests. Caching servers receiving uncacheable content requests retrieve the requested content from a content provider origin server or dynamically generate the content, whereas caching servers receiving cacheable content requests simply serve copies of the content from cache with no access back to the content provider origin server and with little to no processing of the content. For these reasons, persistent request distribution involving requests for cacheable and uncacheable content can lead to disproportionate loads on the caching servers.

There is therefore a need to better optimize request distribution across distributed platform caching servers in order to account for the different loads imposed on the caching servers by cacheable content requests and uncacheable content requests. To this end, there is need to differentiate the distribution of cacheable content requests from the distribution of uncacheable content requests.

BRIEF DESCRIPTION OF THE DRAWINGS

A preferred embodiment of methods and systems for advanced content cacheability determination and routing will now be described, by way of example only, with reference to the accompanying drawings in which.

DETAILED DESCRIPTION

The embodiments provide systems and methods for differentiating between uncacheable content requests and cacheable content requests in order to distribute the uncacheable content requests across a distributed platform differently than the cacheable content requests. The differentiated distribution maintains a proper distribution of load across the distributed platform.

The embodiments differentiate between requests for cacheable content and uncacheable content without analysis or retrieval of the content being requested. Accordingly, requests can be routed in the differentiated manner with little or no additional delay resulting from differentiating the requests as uncacheable content requests or cacheable content requests. In some embodiments, the differentiation is performed based on tracking or modeling of prior requests received at a distributed platform.

Figure 1:
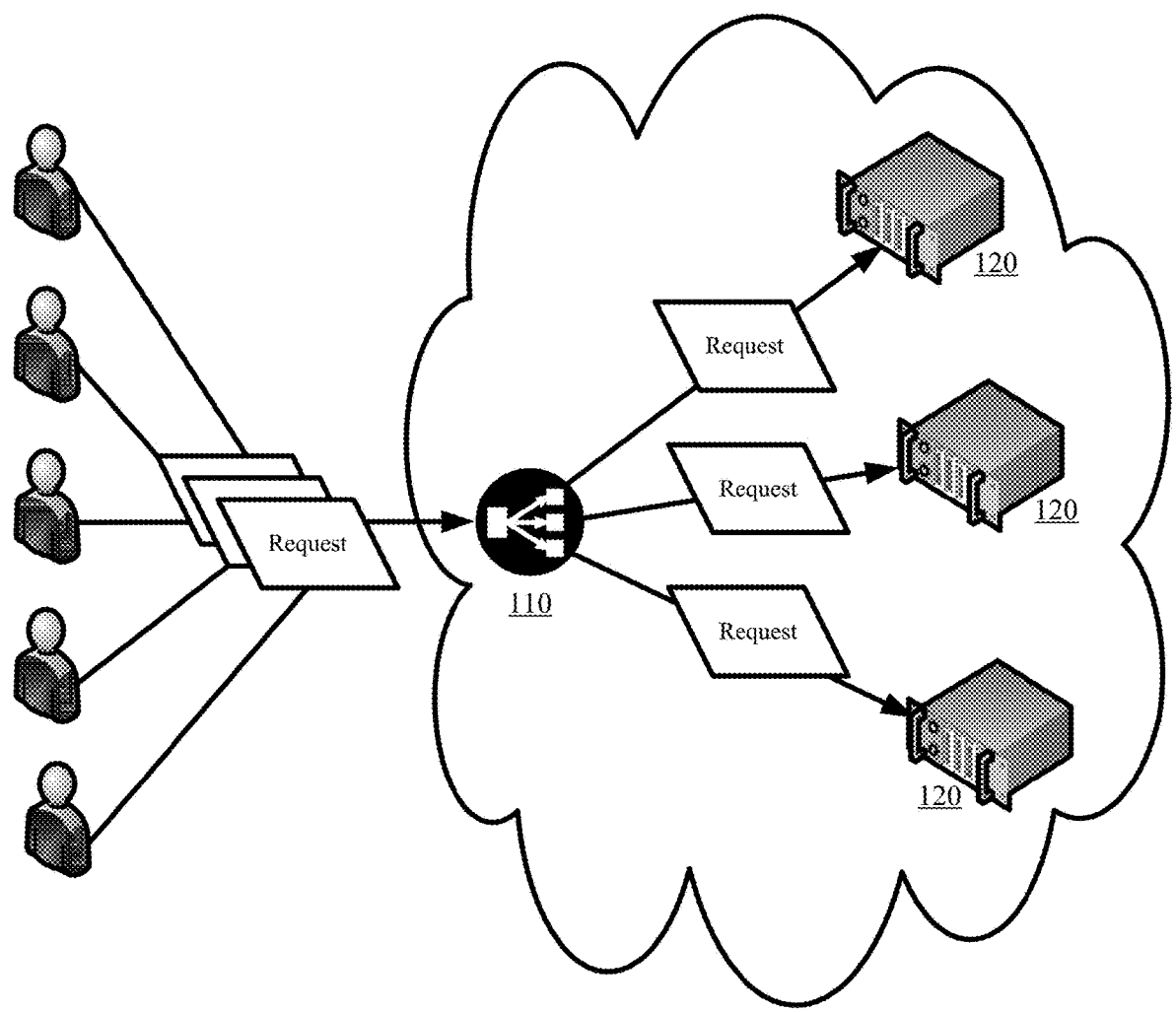
FIG. 1 illustrates a distributed platform point-of-presence in which a director control request distribution across a set of caching servers of the point-of-presence.

The embodiments can be implemented on any machine that controls distribution of requests across a set of content delivery or caching servers. In the context of a distributed platform, such as a content delivery network (CDN), the machine implementing the embodiments is a director. As shown in FIG. 1, the director 110 is a request distribution server or other load balancing device operating within a point-of-presence (PoP) of the distributed platform. The director 110 receives user requests that arrive at the PoP and controls the distribution of the requests across a set of caching servers 120 of the PoP. The set of caching servers 120 then serve content and services in response to the user requests. Although one director 110 is shown in FIG. 1, multiple directors 110 can operate within the same PoP to control the request distribution for that PoP.

The director 110 differentiates requests for cacheable content from requests for uncacheable content on the basis of an identifier present within each request. The director 110 continually monitors request identifiers and the content served in response to each request identifier. In some embodiments, the director 110 distributes a request to a caching server and the caching server sends the requested content back through the director 110 to the requesting user, thereby enabling the director 110 to track whether the returned content is cacheable or uncacheable. In some embodiments, cacheable content is differentiated from uncacheable content based on the "Cache-Control" HyperText Transfer Protocol (HTTP) header field in the content served by the caching servers 120. Uncacheable content has the "Cache-Control" header field set to "no-cache". Cacheable content has the "Cache-Control" header field set with a "max-age" value indicating how long the content can be cached before revalidating. It should be apparent that other header fields as well as analysis of the returned content can be used to differentiate uncacheable content from cacheable content and that the "Cache-Control" header field is provided as one means with which to do so.

In some embodiments, the director differentiates the different request types according to a memorization approach. As part of the memorization approach, the director tracks identifiers of past requests that resulted in uncacheable content being served from the set of caching servers 120 and/or tracks identifiers of past requests that resulted in cacheable content being served from the set of caching servers 120. Subsequent requests received at the director 110 are differentiated based on the request identifiers matching to previously tracked identifiers for cacheable or uncacheable content.

In some embodiments, the director differentiates the different request types according to a machine learning approach. As part of the machine learning approach, the director models characteristics of prior request identifiers that resulted in uncacheable content being served from the set of caching servers 120 and/or models characteristics of prior request identifiers that resulted in cacheable content being served from the set of caching servers 120. Subsequent requests received at the director 110 are differentiated based on the request identifiers containing one or more characteristics in common with the generated models. The director 110 continually prunes and modifies the models as more requests are received.

In some embodiments, the request identifier is the Uniform Resource Locator (URL). In some embodiments, the request identifier is any combination of header fields from the request in addition to or in place of the URL. Therefore, the modeled characteristics can include any one or more of the URL domain name, URL path, URL file name, URL file extension, URL query strings, ports numbers, addressing, or other header parameters. For example, the director may identify that requests directed to a particular URL domain or Transmission Control Protocol (TCP) port number are requests for uncacheable content. Accordingly, the director enters the identified URL domain and TCP port numbers into the list of characteristics used in identifying uncacheable content requests.

By performing the differentiation using the request identifier, the director 110 avoids looking up, retrieving, or obtaining the content being requested. Without incurring the delays for looking up, retrieving, or obtaining the requested content, the director 110 is able to differentiate the requests and route the differentiated uncacheable content requests differently than the differentiated cacheable content requests at about the same level of performance as a director that the routes the requests without differentiation. The differentiated distribution improves the distributed platform's overall content delivery by allowing the distributed platform to optimize for and more efficiently process the different request types. In some embodiments, the differentiated distribution is used to achieve a more even distribution of resource intensive uncacheable content request across the distributed platform caching servers so that no one caching server is overloaded by having to respond to a disproportionate amount of uncacheable content requests. In some embodiments, the differentiated distribution optimizes server capabilities by routing cacheable content requests to servers that are optimized for content caching and by routing uncacheable content requests to servers that are optimized for uncacheable content retrieval.

Figure 2:
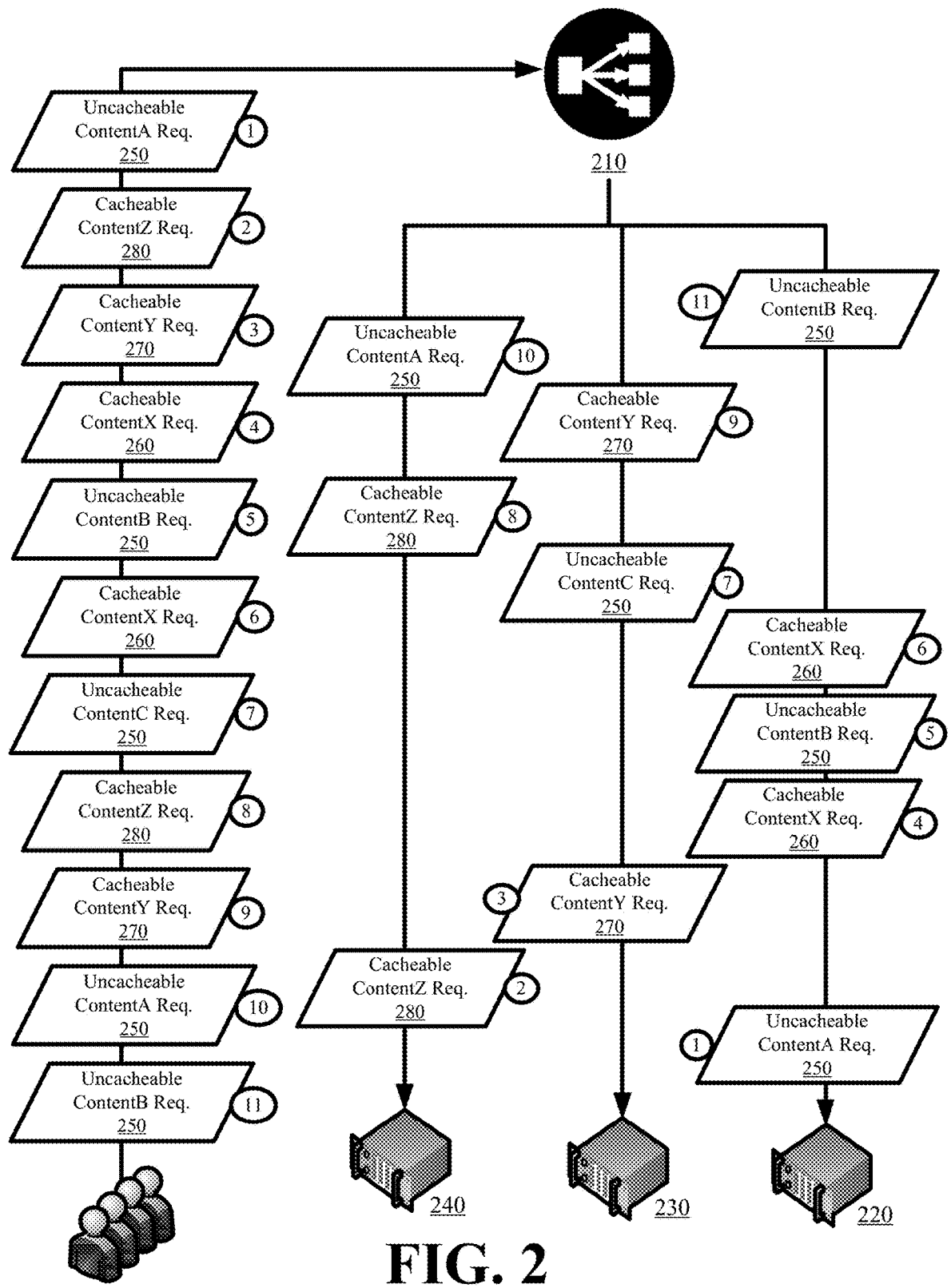
FIG. 2 conceptually illustrates a director differentiating the distribution of cacheable content requests and uncacheable content requests across a set of caching servers in accordance with some embodiments.

FIG. 2 conceptually illustrates a director 210 differentiating the distribution of cacheable content requests and uncacheable content requests across a set of caching servers 220, 230, and 240 in accordance with some embodiments. The director 210 performs a round-robin distribution of uncacheable content requests 250 and performs a different persistent distribution of cacheable content requests 260, 270, and 280. The round-robin distribution causes the uncacheable content requests 250 to be equally distributed across the set of caching servers 220-240, whereas the persistent request distribution causes the cacheable content requests for first content 260 to be routed to a first caching server 220, cacheable content requests for second content 270 to be routed to a second caching server 230, and cacheable content requests for third content 280 to be routed to a third caching server 240.

The persistent distribution of cacheable content requests and the round-robin distribution of uncacheable content requests are examples of two different request distribution schemes that the director can use to differentiate the routing of uncacheable content requests from the routing of cacheable content requests. However, the embodiments can be adapted so that the director performs the differentiated request distribution using any other one or more request distribution schemes. For instance, some embodiments configure the director to perform a lowest load distribution instead of round-robin distribution for uncacheable content requests. In performing the lowest load distribution, the director monitors load at each of the PoP caching servers before routing an uncacheable content request to the caching server having the lowest current load.

Some embodiments provide different routing domains across which the director routes cacheable content requests and uncacheable content requests. In some such embodiments, the director partitions the set of caching servers into a first subset that is optimized for delivery of uncacheable content and a second subset that is optimized for delivery of cacheable content. The first subset of caching servers may include caching servers that have a small amount of memory for caching content. The first subset of caching servers is therefore optimized for uncacheable content delivery because there is little or no cache footprint that is wasted in serving uncacheable content from an origin server. Conversely, the second subset of caching servers has a large amount of memory for caching content. The second subset of caching servers are therefore better suited for responding to cacheable content requests as they are more likely to have the requested content in cache such that a retrieval back to a content provider origin can be avoided.

Figure 3:
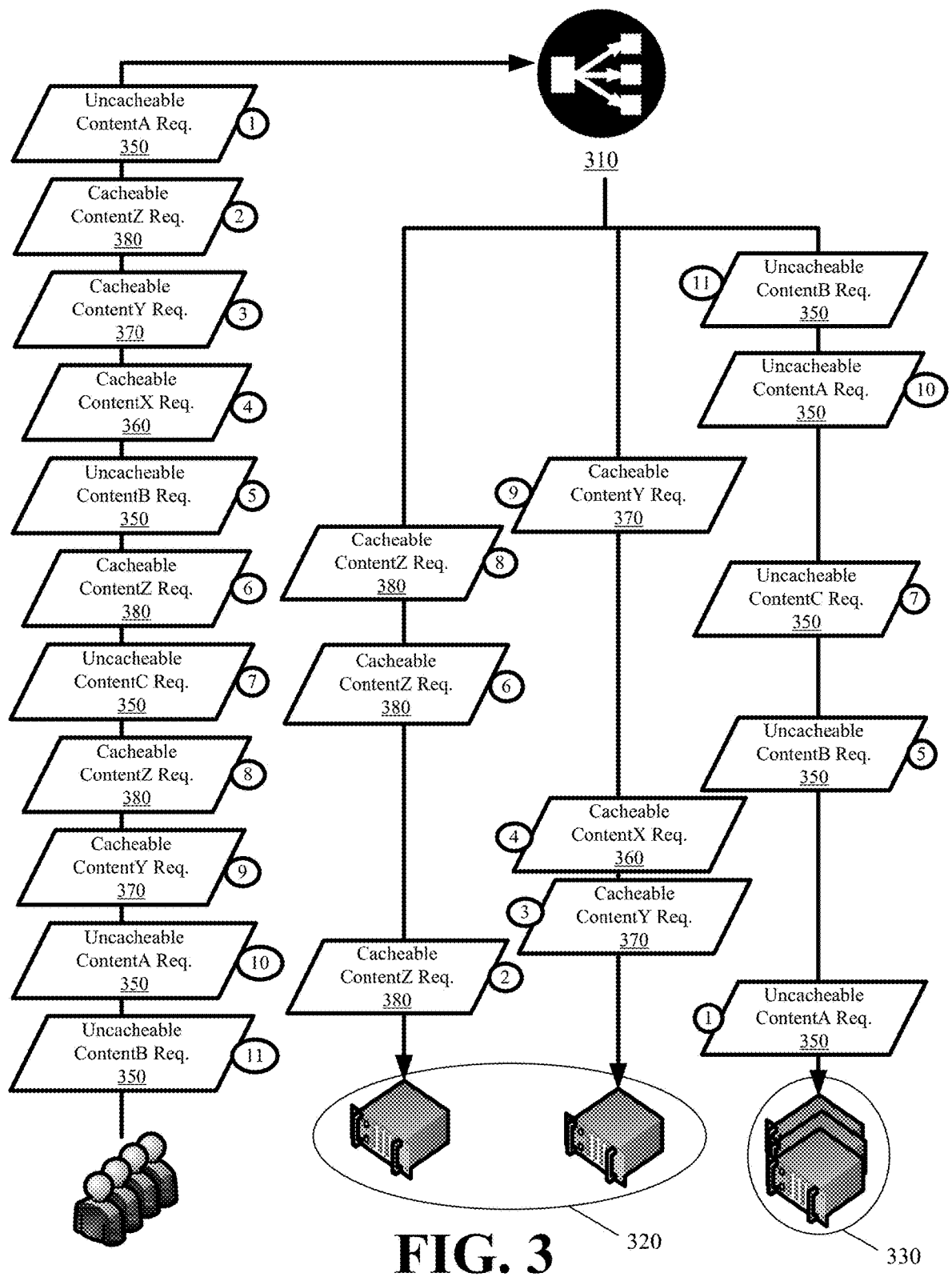
FIG. 3 conceptually illustrates a director differentiating the distribution of cacheable content requests and uncacheable content requests across different caching server domains in accordance with some embodiments.

FIG. 3 conceptually illustrates a director 310 differentiating the distribution of cacheable content requests and uncacheable content requests across different caching server domains 320 and 330 in accordance with some embodiments. In this figure, the director 310 restricts the routing of cacheable content requests 360, 370, and 380 to a first subset of the set of caching servers 320 and restricts the routing of uncacheable content requests 350 to a different second subset of the set of caching servers 330. In particular, upon receiving a cacheable content request, the director 310 uses a first request distribution scheme to select one caching server from the first subset of caching servers 320 to receive and respond to the cacheable content request and upon receiving an uncacheable content request, the director 310 uses a different second request distribution scheme to select one caching server from the second subset of caching servers 330 to receive and respond to the uncacheable content request.

In the figures above, the director is shown to route uncacheable content requests according to a first distribution scheme and cacheable content requests according to a different second distribution scheme. In some cases, the director is unable to differentiate a request as either one for uncacheable content or cacheable content. In such cases, the director may route content that cannot be identified as cacheable or uncacheable content using a third distribution scheme. Alternatively, the director may default the classification of an unidentifiable content request as one of cacheable or uncacheable content and use the corresponding request distribution scheme to select which of the caching servers is to receive and respond to the unidentified content request.

In some embodiments, the director performs the request differentiation without performing the request distribution. In such cases, the director operates as a front-end to a back-end request distributor. The director differentiates the request as cacheable or uncacheable according to the embodiments presented herein. The director modifies the request header with a key value identifying the request as cacheable or uncacheable. The director passes the request with the modified header to a second server or machine operating as the back-end request distributor. The second server or machine then routes or distributes the request according to a first distribution scheme or a second distribution scheme depending on whether the modified header identifies the request as one for cacheable or uncacheable content.

Figure 4:
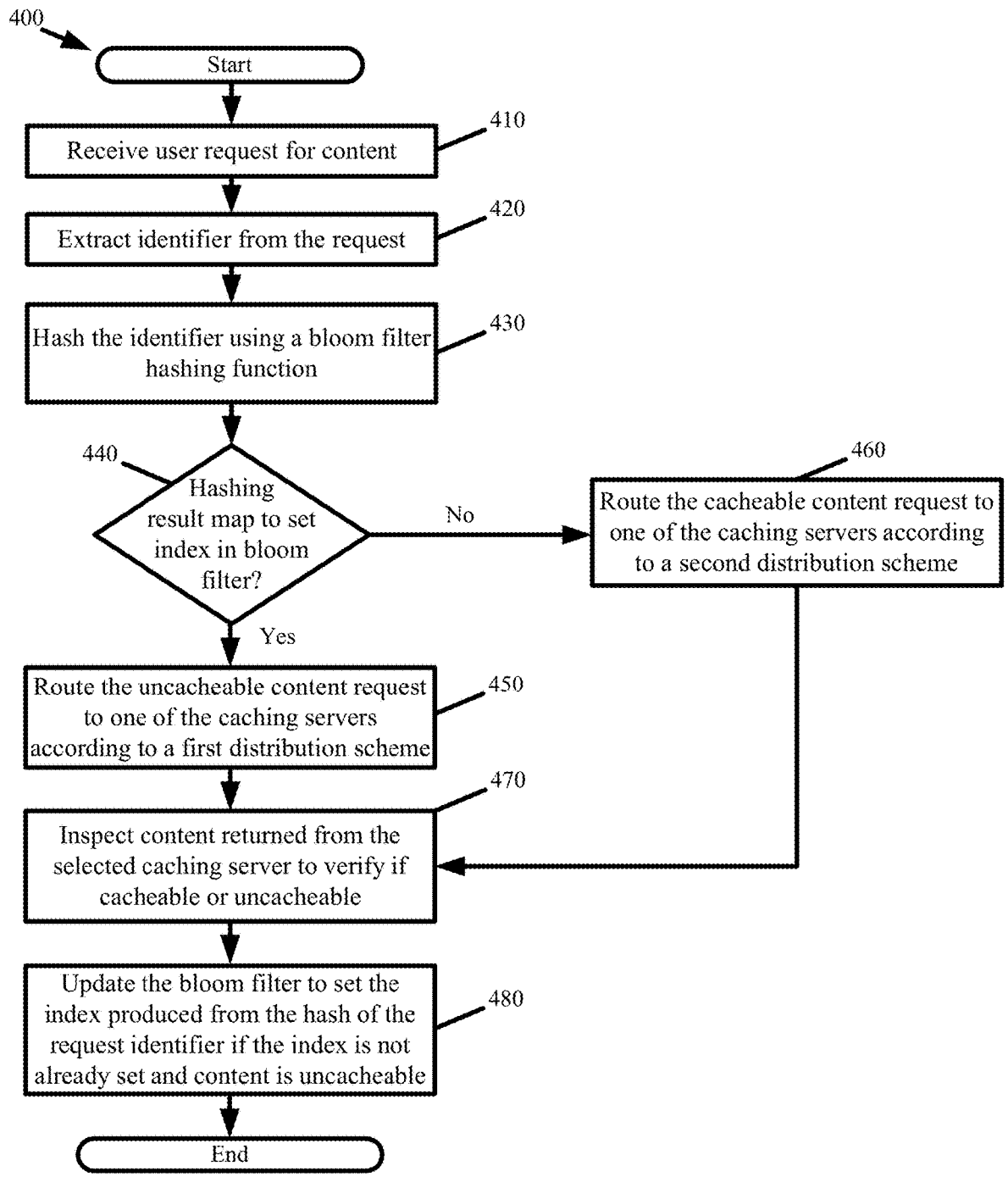
FIG. 4 presents a memorization process for identifying and differentiating uncacheable content requests and cacheable content requests based on a request identifier in accordance with some embodiments.

FIG. 4 presents a memorization process 400 for identifying and differentiating uncacheable content requests and cacheable content requests based on a request identifier in accordance with some embodiments. The process 400 is preferably performed by a director that is configured with at least one bloom filter. As is well known, a bloom filter is a probabilistic data structure for testing whether an element is a member of a set. The bloom filter comprises a set of indices and a hashing function for rapidly and efficiently mapping different elements to different bloom filter indices. In the case of process 400, the bloom filter is adapted to efficiently store prior requests for uncacheable content so that subsequent requests for the same content can be identified as uncacheable content requests.

The process commences upon receiving (at 410) a user request for content. In some embodiments, the director establishes a connection with the user prior to receiving the request. This may involve the director performing a TCP handshake with the user in order to establish the connection over which the request is received.

The process extracts (at 420) an identifier from the request. As noted above, the request is typically the request URL. The process hashes (at 430) the identifier using the bloom filter hashing function. The hash result points to a specific index from the set of indices of the bloom filter.

The process differentiates (at 440) the request as an uncacheable content request or a cacheable content request based on whether the specific index of the bloom filter is set or not set. In particular, the process differentiates the request as a request for uncacheable content based on the hash result mapping to a bloom filter index that has been previously set. In this case, the process routes (at 450) the uncacheable content request to one of the caching servers according to a first distribution scheme.

The process differentiates the request as a request for cacheable content based on the hash result mapping to a bloom filter index that has not been previously set. In this case, the process routes (at 460) the cacheable content request to one of the caching servers according to a different second distribution scheme.

In routing the request to a selected caching server, the director can bridge the connection established with the user to a connection the director establishes with the selected caching server. Accordingly, when the selected caching server responds with the requested content, the director forwards the content through to the user. In doing so, the process inspects (at 470) the returned content in order to verify whether the returned content is cacheable or uncacheable. In some embodiments, the inspection involves analyzing the "Cache-Control" header field or other parts of the returned content to determine if a retrieval was made to an origin server or if a cached copy of the requested content is passed from the caching server. Alternatively, the selected caching server can send a message to the director during or after passage of the requested content to notify the director if the request was for cacheable or uncacheable content based on whether the caching server had to retrieve the requested content from a content provider origin server.

The process ends if the request is verified to be for cacheable content. However, if the request is verified to be for uncacheable content, the process updates (at 480) the bloom filter to set the index produced from the hash of the request identifier if the index is not already set. By continually monitoring requests arriving at the director, the director can continually update the bloom filter to identify requests for new uncacheable content.

By using the bloom filter, the director does not have to track all identifiers (e.g., URLs) for all uncacheable content served by the distributed platform. Instead, a single index within the bloom filter is sufficient to identify a prior uncacheable content request. The hashing function computation introduces little to no additional delay in identifying uncacheable content requests. The bloom filter therefore provides an efficient structure with which to track and identify uncacheable content requests. The bloom filter allows the director to perform the differentiation in near real-time without additional delay. Moreover, the bloom filter allows the director to differentiate requests without looking up, retrieving, or obtaining copies of the requested content.

In some embodiments, the director is configured with two bloom filters. In some such embodiments, the first bloom filter tracks and identifies uncacheable content requests and the second bloom filter tracks and identifies cacheable content requests. In this two bloom filter implementation, a director identifies a request for new content based on the hash result of the request identifier mapping to indices in the first and second bloom filters that have not been previously set. In some embodiments, the same hashing function can be used to map request identifiers to indices of the two bloom filters.

Figure 5:
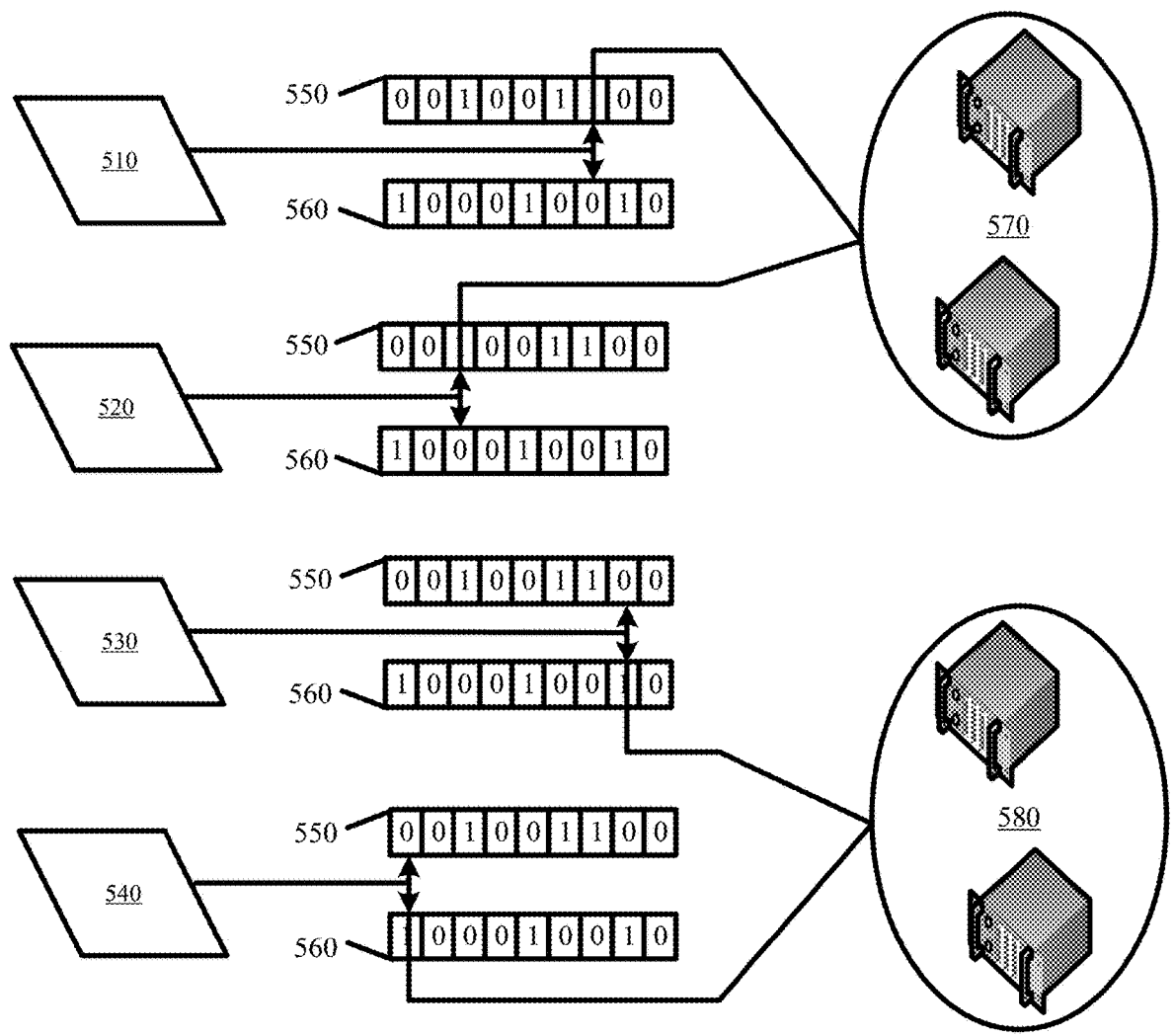
FIG. 5 conceptually illustrates the two bloom filter implementation in accordance with some embodiments.

FIG. 5 conceptually illustrates the two bloom filter implementation in accordance with some embodiments. The figure presents a set of requests 510, 520, 530, and 540, a first bloom filter 550 tracking uncacheable content requests, a second bloom filter 560 tracking prior requests for cacheable content, a first server domain 570 that is optimized or configured for uncacheable content delivery, and a second server domain 580 that is optimized or configured for cacheable content delivery.

The figure illustrates using the bloom filters 550 and 560 to differentiate requests 510 and 520 as uncacheable content requests and distributing these requests 510 and 520 according to a first distribution scheme across the first server domain 570. The figure also illustrates using the bloom filters 550 and 560 to differentiate requests 530 and 540 as cacheable content requests and distributing these requests 530 and 540 according to a second distribution scheme across the second server domain 580.

A director can potentially misroute a request that cannot be differentiated as either cacheable or uncacheable based on prior requests entered to the bloom filter(s). However, the number of improperly routed requests will be fractional relative to the total number of requests that a distributed platform receives daily. This is because it is extremely rare for a distributed platform to serve only a single request for any content instance served by the distributed platform.

Nevertheless, the number of unclassified requests can be minimized by having directors operating in different distributed platform PoPs regularly share bloom filters with one another. The sharing of bloom filters allows a director in a first distributed platform PoP to update its own bloom filter with set indices from a bloom filter provided by a director in a second distributed platform PoP, wherein the set indices represent the uncacheable content requests received and identified by the second PoP director. In this manner, the directors can share request information with one another, thereby allowing the directors in the different PoPs to perform the request differentiation not just based on requests observed at one PoP, but based on requests observed at all distributed platform PoPs.

Another way to minimize the number of unclassified requests is to train the directors, and more specifically, the bloom filters prior to placing them in production. Training the bloom filters involves recording distributed platform request traffic for some period of time and passing the recorded traffic to the director prior to the director receiving requests directly from distributed platform users.

In some embodiments, the uncacheable content bloom filter can be updated at the time a content provider places uncacheable content on the distributed platform for delivery. The content provider identifies the uncacheable content it wishes the distributed platform to deliver on its behalf. The distributed platform then hashes the identifier for each identified content and updates the uncacheable content bloom filter before a user request is received for the content. This avoids potential for misrouting when content is first requested from the distributed platform. Similar training or pre-configuration can be performed for a bloom filter used to track cacheable content requests.

It should be noted that the bloom filter size (i.e., the number of bloom filter indices) is set to minimize the potential for a false positive, whereby the hash of two different request identifiers map to the same index. In some embodiments, the bloom filter size is set based on an estimate of the total number of unique content (cacheable and uncacheable) the distributed platform delivers on behalf of its clients.

The embodiments above have been described with respect to using one or more bloom filter to track content requests. It should be noted that the embodiments can easily be adapted to use hash tables or other similar data structures instead of the bloom filter to efficiently track requests.

In addition to or instead of differentiating requests from memorizing or tracking prior request identifiers, some embodiments use machine learning to model characteristics of cacheable and uncacheable content request identifiers. From the modeled characteristics, the director can predict the cacheability of requests that have not been previously seen at the distributed platform.

Figure 6:
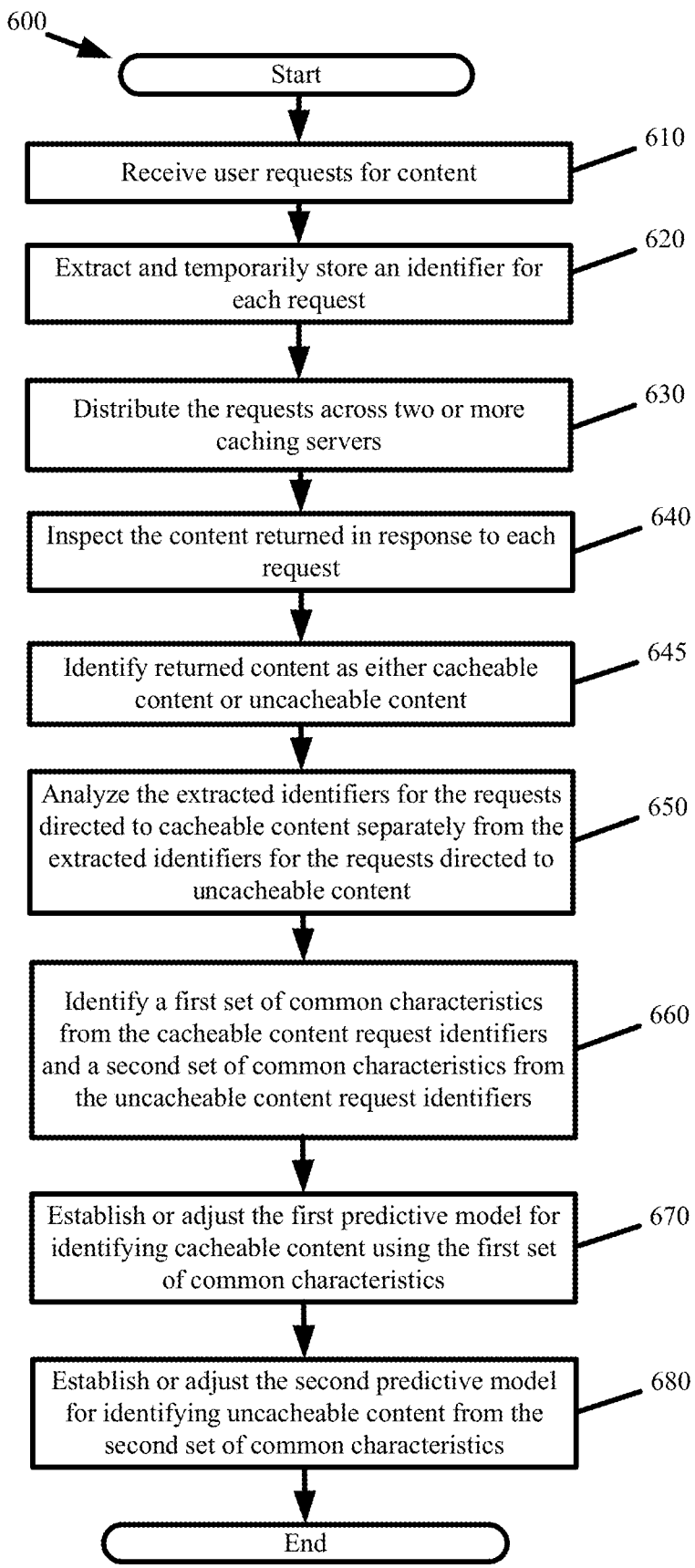
FIG. 6 presents a process for modeling characteristics of cacheable content requests and uncacheable content requests in accordance with some embodiments.

FIG. 6 presents a process 600 for modeling characteristics of cacheable content requests and uncacheable content requests in accordance with some embodiments. The process 600 can be performed by a director or by a set of directors operating in different distributed platform PoPs.

The process 600 commences with a director receiving (at 610) several requests. The process extracts (at 620) and temporarily stores an identifier from each request before distributing (at 630) the requests across two or more caching servers. The process attempts to differentiate cacheable content requests from uncacheable content requests prior to the distribution by comparing request identifiers to cacheable content request characteristics stored to a first predictive model and by comparing identifiers to uncacheable content request characteristics stored to a different second predictive model.

The process then inspects (at 640) the content returned in response to each request in order to identify (at 645) the returned content as either cacheable content or uncacheable content. Next, the process analyzes (at 650) the extracted identifiers for the requests directed to cacheable content separately from the extracted identifiers for the requests directed to uncacheable content. From the analysis, the process identifies (at 660) a first set of common characteristics within the cacheable content request identifiers and a second set of common characteristics within the uncacheable content request identifiers.

The process establishes (at 670) or adjusts the first predictive model for identifying cacheable content using the first set of common characteristics and establishes (at 680) or adjusts the second predictive model for identifying uncacheable content from the second set of common characteristics. Each predictive model can be directly defined with one or more of the identified common characteristics. Alternatively or additionally, each predictive model can be defined using wildcard characters, patterns, or regular expressions that encompass two or more characteristics. For instance, the process may identify common characteristics within URLs for uncacheable content to include "js", "java*", "cart", and "dynamic" and may identify common characteristics within the URLs for cacheable content to include "*.jpg", "*.tiff", and "images". The common characteristics defining the predictive models can include any combination of URL domain names, URL paths, URL file names, URL file extensions, URL query string parameters, request header port numbers, request header protocols, request header addressing, request header user agent, and other request header fields. In cases where there is no commonality between two different requests of cacheable or uncacheable content, the process may use the complete identifier, such as the complete URL, in defining a predictive model.

In some embodiments, adjusting a previously established predictive model involves improving the accuracy of the predictive model. The director can remove a common characteristic from the predictive model based on some percentage of incorrect differentiations resulting from that common characteristic. Alternatively, the director can adjust the predictive model so that routing occurs when a secondary common characteristic is present with another common characteristic. For instance, the characteristic "images", in a few instances, is used in requesting uncacheable content, even though a majority of the time the characteristic is used in requesting cacheable content. Accordingly, the director can adjust its model so that requests with the "images" characteristic also require a "jpeg" or "tiff" secondary characteristic in order to be classified as requests for cacheable content.

Figure 7:
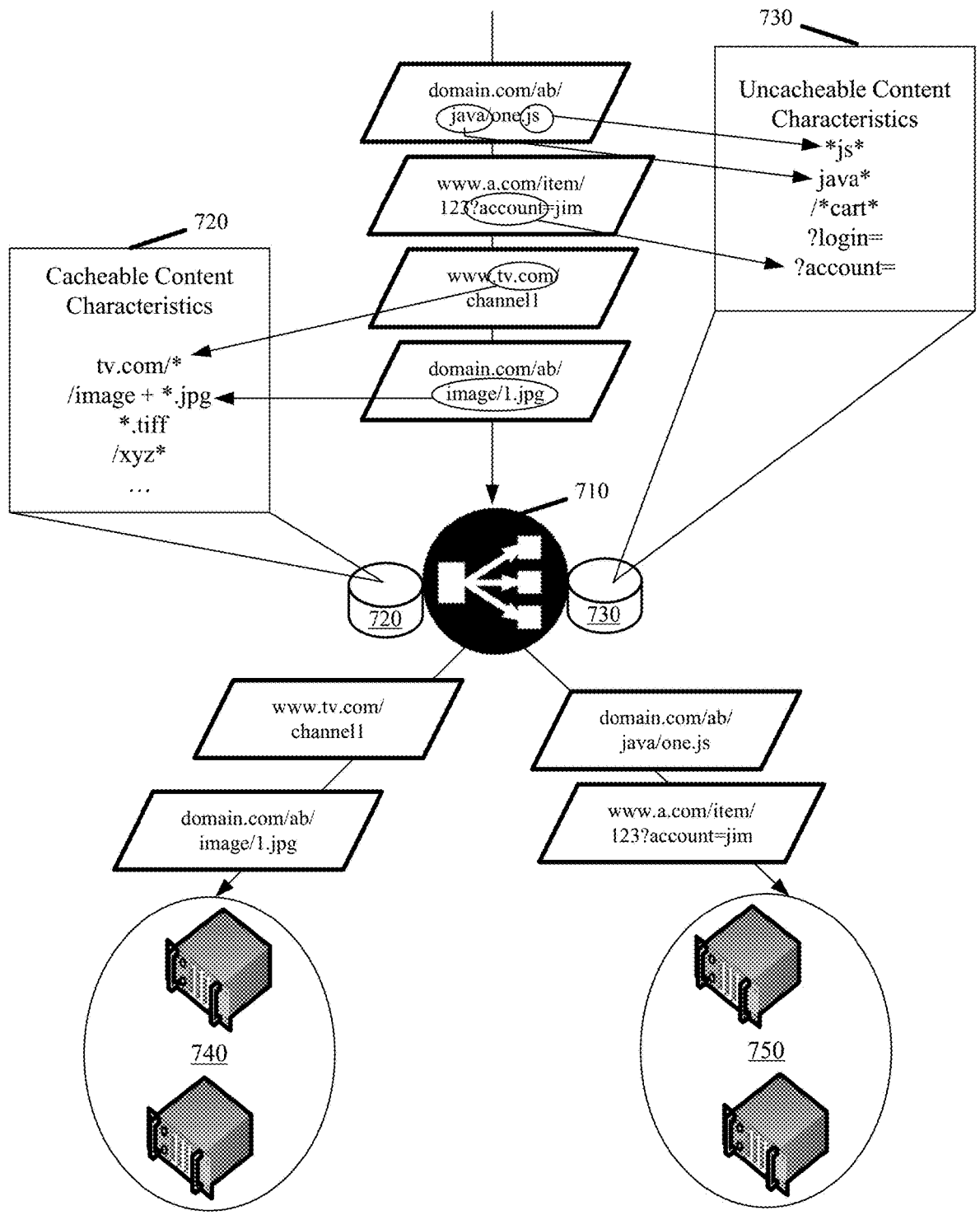
FIG. 7 illustrates a director using the common characteristics of each predictive model to differentiate and distribute subsequently received requests.

FIG. 7 illustrates a director 710 using the common characteristics of each predictive model to differentiate and distribute subsequently received requests. The director 710 forms a first predictive model 720 comprising characteristics of cacheable content and a second predictive model 730 comprising characteristics of uncacheable content. The director 710 differentiates requests based on the request identifiers matching one or more of characteristics of one of the first and second predictive models 720 and 730. In particular, the director 710 differentiates requests having one or more characteristics in common with the first predictive model 720 as cacheable content requests and distributes the differentiated cacheable content requests across a first server domain 740 using a first distribution scheme (e.g., persistent distribution). The director 710 differentiates requests having one or more characteristics in common with the second predictive model 730 as uncacheable content requests and distributes the differentiated uncacheable content requests across a second server domain 750 using a second distribution scheme (e.g., round robin).

If a request has no characteristics in common with either predictive model 720 or 730, the director 710 can perform a default distribution. In some embodiments, the default distribution can be the first distribution scheme when a majority of requests distributed by the director 710 are determined to be cacheable content requests or the second distribution scheme when a majority of requests distributed by the director 710 are determined to be uncacheable content requests. In some other embodiments, the default distribution is set as one of the first or second distribution scheme regardless of the classification of the other requests. The default distribution can also involve a different distribution than either the first or second distribution schemes used for cacheable and uncacheable content request distribution. For instance, the default distribution can involve a round-robin request distribution across all available content delivery servers or caching servers.

Characteristics from a particular request can also match multiple characteristics of the different predictive models 720 and 730. In such cases, the director 710 can classify a request as a cacheable or uncacheable content request based on the predictive model that has the most characteristics in common with the request. In other words, the director differentiates a request as a cacheable content request when the request characteristics match more regular expressions of the first predictive model 720 than the regular expressions of the second predictive model 730. Should the request characteristics match an equal number of characteristics of the first and second predictive models 720 and 730, the director may differentiate the request according to the first or most heavily weighted matching characteristic.

Some embodiments use machine learning to model probabilities of each characteristic belonging to a cacheable content class or an uncacheable content class. In some such embodiments, the director predicts whether a request is for cacheable or uncacheable content based on a probability computed from the different characteristics in the request identifier and the frequency with which those characteristics appear in prior cacheable content request identifiers and in prior uncacheable content request identifiers.

Figure 8:
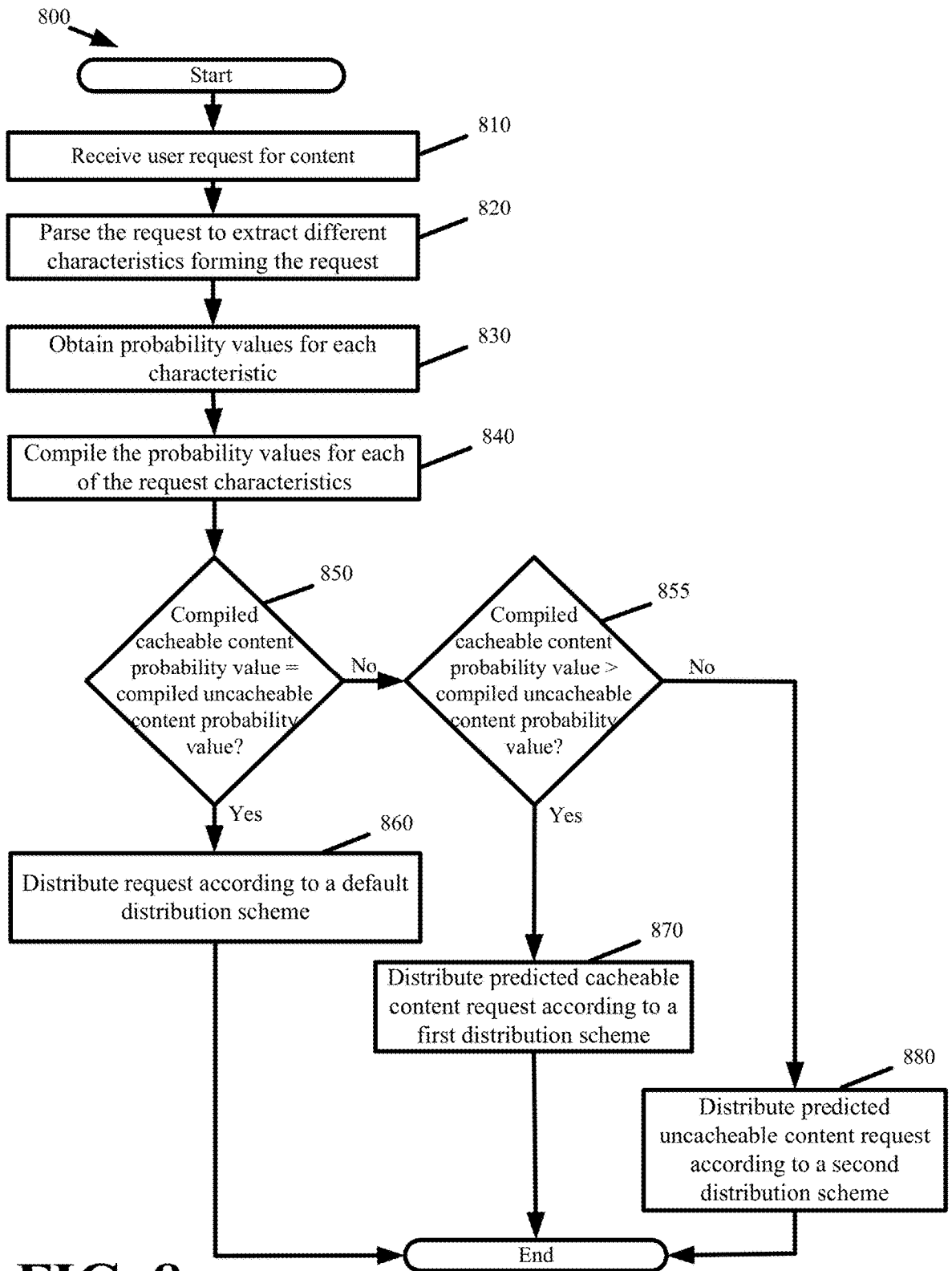
FIG. 8 presents a process for predicting request cacheability based on request characteristic probabilities.

FIG. 8 presents a process 800 for predicting request cacheability based on request characteristic probabilities. The process 800 commences with a director receiving (at 810) a request. The process parses (at 820) the request to extract the different characteristics forming the request. In some embodiments, the characteristics are defined to be request URL paths or segments delimited by the "/" character as well as URL query string arguments delimited by "=" and "&" characters. Characteristics can be delimited with other symbols or can be defined to be any pattern, segment, or character set within the request URL. For example, periods, question marks, and commas can be used to separate the different characteristics of a URL.

The process obtains (at 830) probability values for each characteristic. The probability values for a particular characteristic indicate the likelihood of the particular characteristic being included as part of a cacheable content request or as part of an uncacheable content request. In some embodiments, each characteristic has a first probability value indicating the likelihood of the characteristic being included as part of a cacheable content request and a second probability value indicating the likelihood of being included as part of an uncacheable content request.

Figure 9:
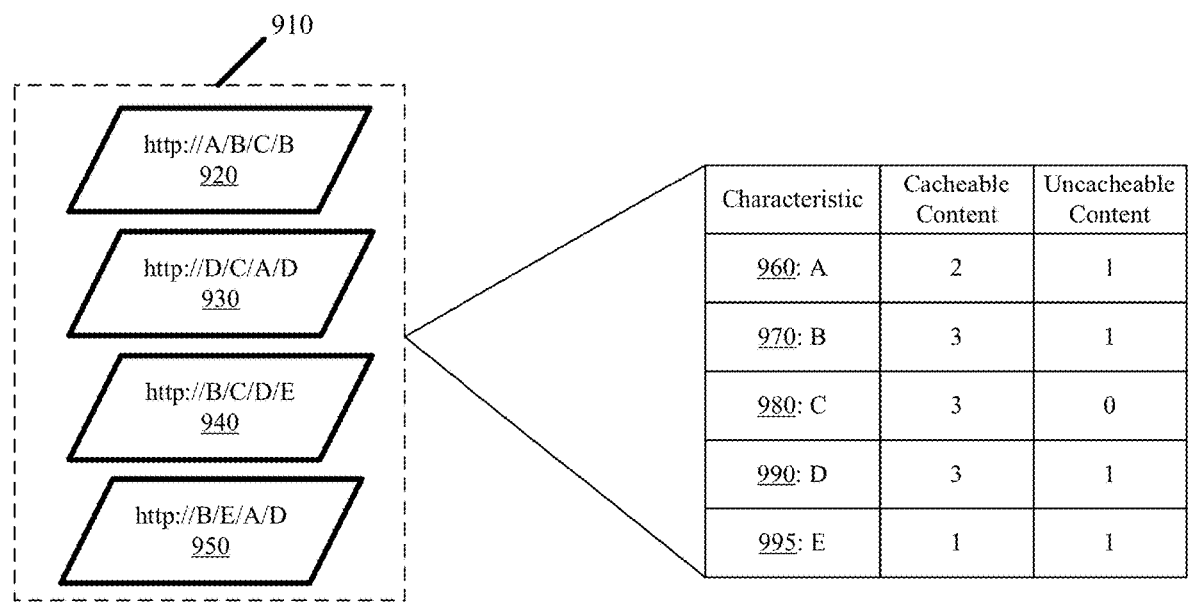
FIG. 9 conceptually illustrates forming a predictive model from a set of request URLs.

The probability values are obtained from predictive models that track the frequency of request characteristics appearing as part of cacheable and uncacheable content requests. FIG. 9 conceptually illustrates forming such a predictive model from a set of request URLs 910. The set of request URLs 910 are from four requests 920, 930, 940, and 950 that the director incorrectly distributes. The incorrect distribution triggers the predictive model updating. In particular, the characteristics of the first, second, and third cacheable content requests 920, 930, and 940 that were improperly predicted as uncacheable content requests are used to update the predictive model for cacheable content requests and the characteristics of the fourth cacheable content request 950 that was improperly predicted as a cacheable content are used to update the predictive model for uncacheable content requests. Consequently, the predictive model tracks the frequency with which each characteristic 960, 970, 980, 990, and 995 within the set of URLs 910 is correctly part of a cacheable content request or correctly part of an uncacheable content request. The director may generate or contribute to the predictive model during operation.

With reference back to FIG. 8, the process compiles (at 840) the probability values for each of the request characteristics. Request characteristics that are not found in either of the predictive models can be assigned a value of zero or ignored.

The process compares the compiled cacheable content probability value and the compiled uncacheable content probability value in order to predict whether the request is directed to cacheable content, uncacheable content, or content that cannot be differentiated. If the comparison (at 850) identifies the compiled cacheable content probability value and the compiled uncacheable content probability value to be zero or equal, the process performs (at 860) a default distribution. If the comparison (at 855) identifies the cacheable content probability value to be greater than the compiled uncacheable content probability value, the process predicts the request to be a cacheable content request and distributes (at 870) the request according to a first distribution scheme. Otherwise, the compiled cacheable content probability value is less than the compiled uncacheable content probability value. In this case, the process predicts the request to be an uncacheable content request and distributes (at 880) the request according to a different second distribution scheme. As noted above with reference to FIG. 7, the default distribution can be the first distribution scheme when a majority of requests are predicted to be cacheable content requests or the second distribution scheme when a majority of requests are predicted to be uncacheable content requests. The default distribution can also be set as one of the first or second distribution scheme or a different third distribution scheme.

Figure 10:
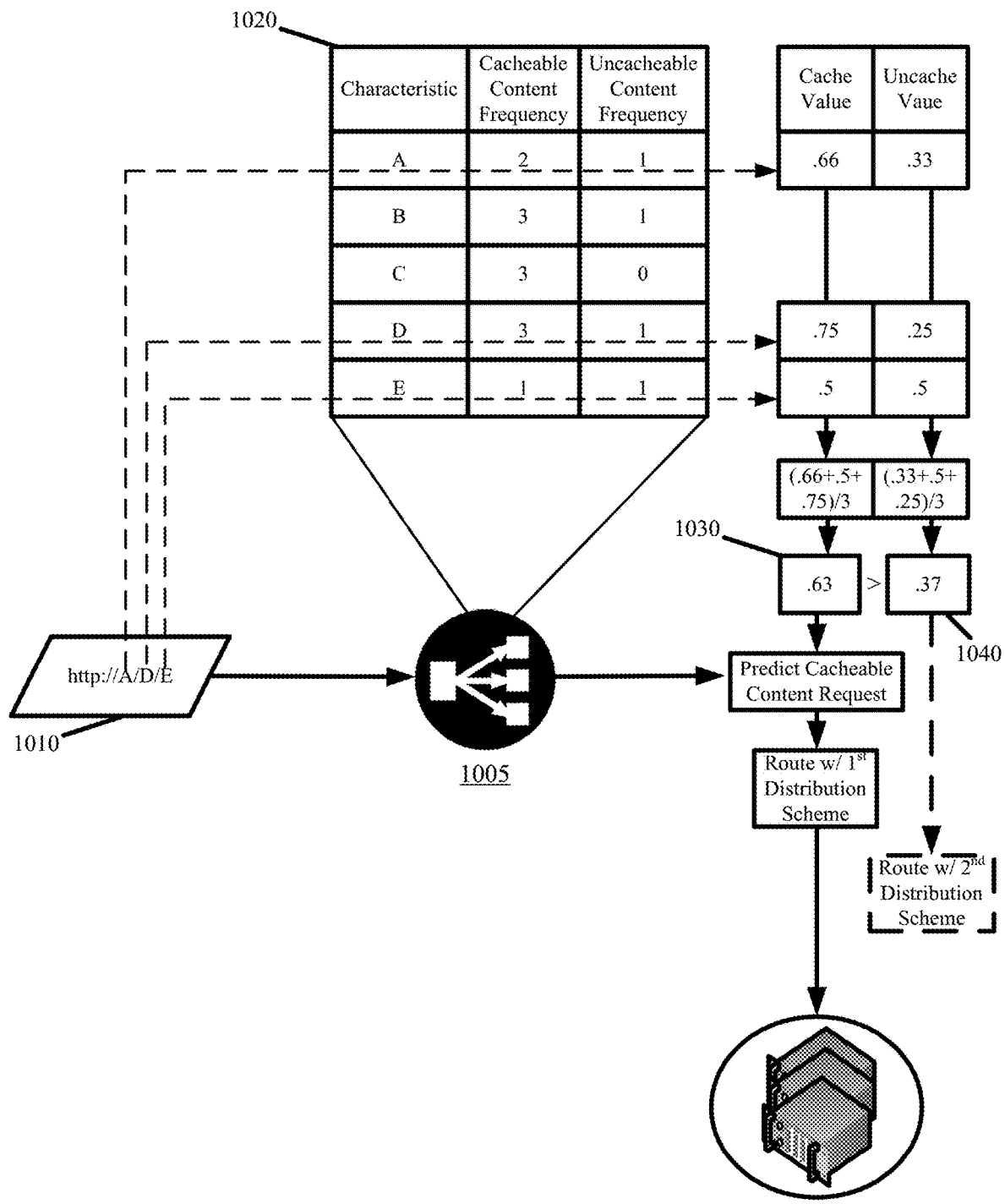
FIG. 10 conceptually illustrates predictively differentiating a newly received request based on the predictive model of FIG. 9.

FIG. 10 conceptually illustrates predictively differentiating a newly received request based on the predictive model of FIG. 9. FIG. 10 illustrates the director 1005 receiving a new request 1010. The director 1005 parses the request identifier and extracts the different characteristics forming the request identifier. The director 905 computes a first probability 1030 for differentiating the request as a cacheable content request and a second probability 1040 for differentiating the request as an uncacheable content request based on the frequency of characteristics appearing in the predictive model 1020. In some embodiments, the first probability 1030 is derived from the total average frequency of the characteristics appearing in cacheable content requests of the predictive model 1020. The second probability 1040 is similarly derived from the total average frequency of the characteristics appearing in uncacheable content requests of the predictive model 1020.

The director differentiates the request as a cacheable content request in response to the first probability being greater than the second probability and differentiates the request as an uncacheable content request in response to the second probability being greater than the first probability. Based on the differentiation, the director selects a distribution routing scheme with which to route the request across a set of caching servers. Empirical testing within different distributed platforms using real-world traffic has shown that the identifier characteristic frequency modeling differentiates requests as cacheable or uncacheable requests with upwards of 99% accuracy.

Some embodiments use a training set of URLs to initialize the predictive models that track characteristic frequencies. The training set of URLs may be identifiers from a prior set of recorded requests.

Alternatively, some embodiments configure the director with an empty predictive model. When the director is unable to predict the cacheability of a request using the characteristic frequencies of the predictive model, the director distributes the request according to a default decision. The director then updates characteristic frequency counts in the predictive model in response to requests that are improperly distributed. For instance, the director updates frequency counts for characteristics of cacheable content based on characteristics of a request that was improperly classified as an uncacheable content request.

Some embodiments combine the bloom filters with one or more of the above identified predictive models. This combined approach uses the bloom filters to differentiate requests that the director has previously seen and uses the predictive models to differentiate requests that the director has not previously seen and that cannot be dedifferentiated using the bloom filters. The director therefore receives the efficiency and accuracy of the bloom filters along with the predictive capabilities of the predictive models.

In some such embodiments, the director maintains a first bloom filter to track received requests for uncacheable content and a second bloom filter to track received requests for cacheable content. From the identifiers of the prior requests entered into the bloom filters, the director develops a first predictive model comprising a first set of characteristics of uncacheable content requests and a second predictive model comprising a second set of characteristics of cacheable content requests.

Thereafter, when the director receives a request, it extracts and hashes the request identifier. In response to the hash result mapping to a set index within the first bloom filter, the director identifies the request as an uncacheable content request and routes the request according to a first distribution scheme. In response to the hash result mapping to a set index within the second bloom filter, the director identifies the request as a cacheable content request and routes the request according to a second distribution scheme. If the hash result does not map to a set index of either bloom filter, the director determines if the request identifier contains one or more characteristics from which the request type can be predicted.

Thus far, the embodiments have been described with respect to differentiating between requests for cacheable content and uncacheable content. However, the embodiments are not limited to this single differentiation. The bloom filters and predictive models can be adapted to differentiate and route requests on a different basis. For instance, the bloom filters can be used to track and differentiate requests that require server-side processing from requests that do not. In such cases, the director can route requests requiring server-side processing using a first request distribution scheme and route requests that do not request server-side processing using a different second request distribution scheme, wherein the first request distribution scheme prioritizes the selection of servers with greater processing power or lower loads, and wherein the second request distribution scheme performs a persistent request distribution across the available set of caching servers.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 11:
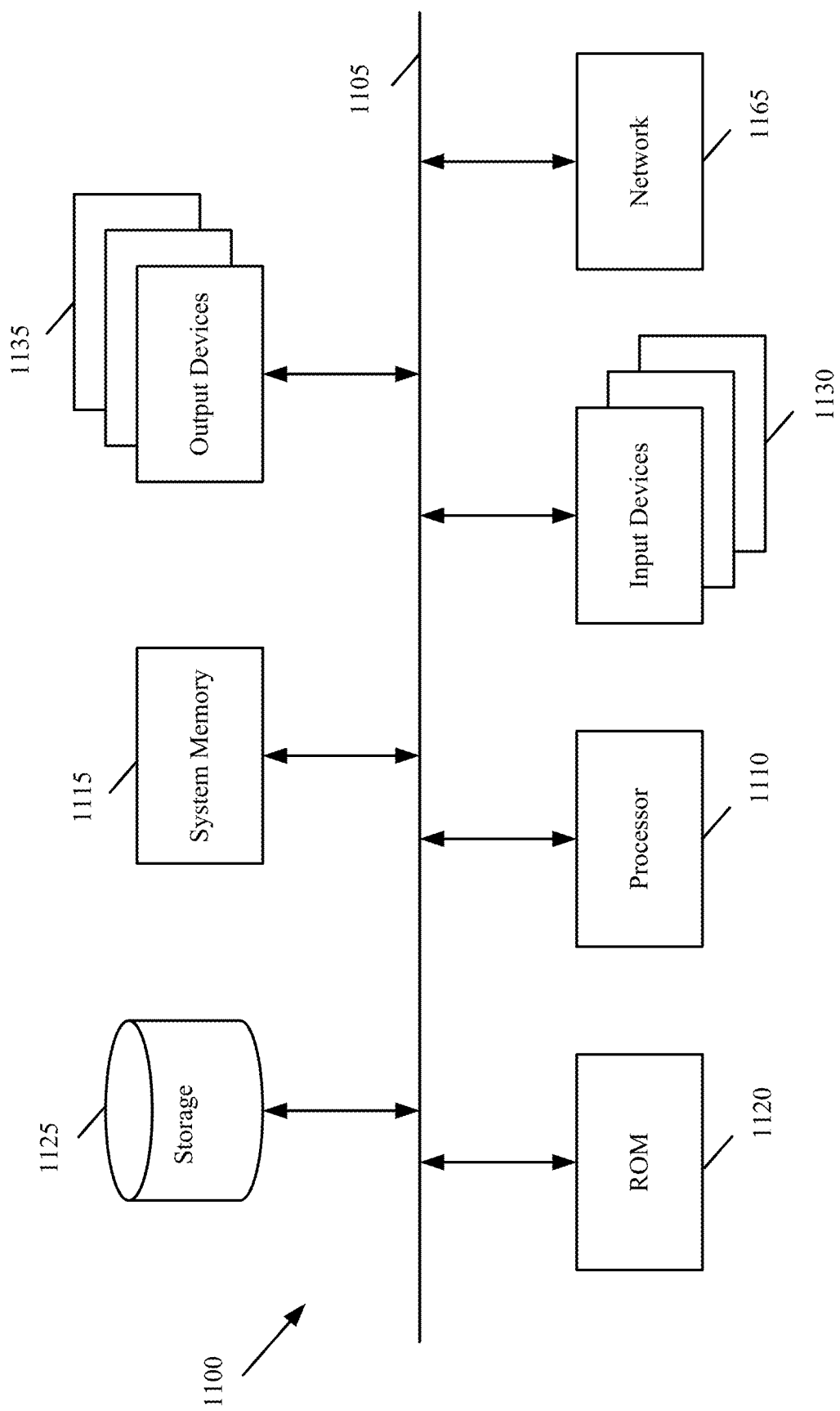
FIG. 11 illustrates a computer system or server with which some embodiments are implemented.

FIG. 11 illustrates a computer system or server with which some embodiments are implemented. Such a computer system includes various types of computer-readable mediums and interfaces for various other types of computer-readable mediums that implement the various methods and machines described above (e.g., director, large size content optimized caching server, or small size content optimized caching server). Computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the invention. The processor 1110 is a processing device such as a central processing unit, integrated circuit, graphical processing unit, etc.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1125.

Other embodiments use a removable storage device (such as a flash drive) as the permanent storage device. Like the permanent storage device 1125, the system memory 1115 is a read-and-write memory device. However, unlike storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the computer system. The input devices 1130 include alphanumeric keypads (including physical keyboards and touchscreen keyboards), pointing devices. The input devices 1130 also include audio input devices (e.g., microphones, MIDI musical instruments, etc.). The output devices 1135 display images generated by the computer system. The output devices include printers and display devices, such as cathode ray tubes (CRT) or liquid crystal displays (LCD).

Finally, as shown in FIG. 11, bus 1105 also couples computer 1100 to a network 1165 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 1100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A request distribution device comprising:
a non-transitory computer-readable medium storing a set of processor-executable instructions; and
one or more processors configured to execute the set of processor-executable instructions, wherein executing the set of processor-executable instructions causes the one or more processors to:
generate a predictive model based on a set of characteristics repeating in (i) each of a first set of requests that resulted in a first type of content being returned, or (ii) each of a different second set of requests that resulted in a second type of content being returned, wherein each characteristic of the set of characteristics comprises a part that is less than all of a Uniform Resource Locator ("URL"), a regular expression, or a pattern repeating in the first set of requests or the second set of requests;

receive a particular request with at least one characteristic that is different than the set of characteristics and each request of the first set of requests and the second set of requests, and that is used to request different content than content returned in response to each request of the first set of requests and the second set of requests;

classify the particular request as a request directed to the first type of content or the second type of content based on a number or probability of characteristics of the particular request matching the set of characteristics of the predictive model;

distribute the particular request to one of a first set of servers based on a first request distribution scheme that prioritizes selection of the first set of servers over a second set of servers, and that is selected as a result of classifying the particular request as a request directed to the first type of content; and distribute the particular request to one of the second set of servers based on a different second request distribution scheme that prioritizes selection of the second set of servers over the first set of servers, and that is selected as a result of classifying the particular request as a request directed to the second type of content.

2. The device of claim 1,
wherein the first type of content is common content that the first set of servers serve to two or more different users; and
wherein the second type of content is dynamic content that the second set of servers customize in some form for each requesting user.

3. The device of claim 1, wherein the processor-executable instructions further include processor-executable instructions to:
detect a type for particular content that is returned in response to distributing the particular request; and
modify the predictive model based on the type of the particular content.

4. The device of claim 3, wherein the processor-executable instructions to modify the predictive model include processor-executable instructions to:
add characteristics of the particular request to the set of characteristics used to generate the predictive model.

5. The device of claim 1, wherein the processor-executable instructions to generate the predictive model include processor-executable instructions to:
determine, from the set of characteristics, a first subset of characteristics that have a higher probability of being included in the first set of requests, that resulted in the first type of content being returned, than being included in the second set of requests, that resulted in the second type of content being returned; and
determine, from the set of characteristics, a different second subset of characteristics that have a higher probability of being included in the second set of requests, that resulted in the second type of content being returned, than being included in the first set of requests, that resulted in the first type of content being returned.

6. The device of claim 5, wherein the processor-executable instructions to classify the particular request include processor-executable instructions to:
identify the characteristics of the particular request from a URL of the particular request;
compute a first probability value based on one or more characteristics of the particular request matching to the first subset of characteristics;
compute a second probability value based on one or more characteristics of the particular request matching to the second subset of characteristics; and
predict the particular request as a request directed to the first type of content in response to the first probability value being greater than the second probability value.

7. The device of claim 1, wherein the processor-executable instructions to classify the particular request include processor-executable instructions to:
produce a first probability value based on a number of the characteristics of the particular request matching to characteristics of the first set of requests that resulted in the first type of content being returned;
produce a second probability value based on a different number of the characteristics of the particular request matching to characteristics of the second set of requests that resulted in the second type of content being returned;
predict the particular request as a request directed to the first type of content in response to the first probability value being greater than the second probability value.

8. The device of claim 1, wherein the processor-executable instructions to generate the predictive model include processor-executable instructions to:
define a first set of probabilities for the predictive model based on a frequency of different characteristics being present in different requests of the first set of requests; and
define a second set of probabilities for the predictive model based on a frequency of different characteristics being present in different requests of the second set of requests.

9. The device of claim 1, wherein the processor-executable instructions to generate the predictive model include processor-executable instructions to:
compile a first set of characteristics from URLs of each request of the first set of requests; and
compile a different second set of characteristics from URLs of each request of the second set of requests.

10. The device of claim 9, wherein the processor-executable instructions to classify the particular request include processor-executable instructions to:
classify the particular request as a request directed to the first type of content based on a greater number of the characteristics of the particular request matching to the first set of characteristics than to the second set of characteristics; and
classify the particular request as a request directed to the second type of content based on a greater number of the characteristics of the particular request matching to the second set of characteristics than to the first set of characteristics.

11. The device of claim 1, wherein the processor-executable instructions to distribute the particular request based on the first request distribution scheme include processor-executable instructions to:
select the first set of servers from a plurality of servers based on filtering criteria of the first request distribution scheme, wherein the plurality of servers comprises the first set of servers and the second set of servers; and select a particular server of the first set of servers based on a hash of a URL of the particular request.

12. The device of claim 1, wherein the processor-executable instructions further include processor-executable instructions to:

receive a second request that matches a previous request in the first set of requests;

select the first request distribution scheme in response to matching the second request to the previous request in the first set of requests and without using the predictive model to classify a type of the content the second request is directed to; and distribute the second request to a server in the first set of servers based on the first request distribution scheme.

13. A method comprising:

generating a predictive model based on a set of characteristics repeating in (i) each of a first set of requests that resulted in a first type of content being returned, or (ii) each of a different second set of requests that resulted in a second type of content being returned, wherein each characteristic of the set of characteristics comprises a part that is less than all of a Uniform Resource Locator ("URL"), a regular expression, or a pattern repeating in the first set of requests or the second set of requests;

receiving a particular request with at least one characteristic that is different than the set of characteristics and each request of the first set of requests and the second set of requests, and that is used to request different content than content returned in response to each request of the first set of requests and the second set of requests;

classifying the particular request as a request directed to the first type of content or the second type of content based on a number or probability of characteristics of the particular request matching the set of characteristics of the predictive model;

distributing the particular request to one of a first set of servers based on a first request distribution scheme that prioritizes selection of the first set of servers over a second set of servers, and that is selected as a result of classifying the particular request as a request directed to the first type of content; and distributing the particular request to one of the second set of servers based on a different second request distribution scheme that prioritizes selection of the second set of servers over the first set of servers, and that is selected as a result of classifying the particular request as a request directed to the second type of content.

14. The method of claim 13 further comprising:

detecting a type for particular content that is returned in response to distributing the particular request; and modifying the predictive model based on the type of the particular content.

15. The method of claim 13, wherein generating the predictive model comprises:

determining, from the set of characteristics, a first subset of characteristics that have a higher probability of being included in the first set of requests, that resulted in the first type of content being returned, than being included in the second set of requests, that resulted in the second type of content being returned; and determining, from the set of characteristics, a different second subset of characteristics that have a higher probability of being included in the second set of requests, that resulted in the second type of content being returned, than being included in the first set of requests, that resulted in the first type of content being returned.

16. The method of claim 15, wherein classifying the particular request comprises:

identifying the characteristics of the particular request from a URL of the particular request;

computing a first probability value based on one or more characteristics of the particular request matching to the first subset of characteristics;

computing a second probability value based on one or more characteristics of the particular request matching to the second subset of characteristics; and predicting the particular request as a request directed to the first type of content in response to the first probability value being greater than the second probability value.

17. The method of claim 13, wherein classifying the particular request comprises:

producing a first probability value based on a number of the characteristics of the particular request matching to characteristics of the first set of requests that resulted in the first type of content being returned;

producing a second probability value based on a different number of the characteristics of the particular request matching to characteristics of the second set of requests that resulted in the second type of content being returned;

predicting the particular request as a request directed to the first type of content in response to the first probability value being greater than the second probability value.

18. The method of claim 13, wherein generating the predictive model comprises:

defining a first set of probabilities for the predictive model based on a frequency of different characteristics being present in different requests of the first set of requests; and defining a second set of probabilities for the predictive model based on a frequency of different characteristics being present in different requests of the second set of requests.

19. A non-transitory computer-readable medium, storing a set of processor-executable instructions, which, when executed by one or more processors, cause the one or more processors to:

generate a predictive model based on a set of characteristics repeating in (i) each of a first set of requests that resulted in a first type of content being returned, or (ii) each of a different second set of requests that resulted in a second type of content being returned, wherein each characteristic of the set of characteristics comprises a part that is less than all of a Uniform Resource Locator ("URL"), a regular expression, or a pattern repeating in the first set of requests or the second set of requests;

receive a particular request with at least one characteristic that is different than the set of characteristics and each request of the first set of requests and the second set of requests, and that is used to request different content than content returned in response to each request of the first set of requests and the second set of requests;

classify the particular request as a request directed to the first type of content or the second type of content based on a number or probability of characteristics of the particular request matching the set of characteristics of the predictive model;

distribute the particular request to one of a first set of servers based on a first request distribution scheme that prioritizes selection of the first set of servers over a second set of servers, and that is selected as a result of classifying the particular request as a request directed to the first type of content; and distribute the particular request to one of the second set of servers based on a different second request distribution scheme that prioritizes selection of the second set of servers over the first set of servers, and that is selected as a result of classifying the particular request as a request directed to the second type of content.

* * * * *